United States Patent [19]

Compoly

[11] 3,832,622

[45] Aug. 27, 1974

[54] PARALLEL PHASE LOCK CIRCUITRY FOR INVERTERS AND THE LIKE

[75] Inventor: Albert William Compoly, Monmouth, N.J.

[73] Assignee: Avionic Instruments Inc., Rahway, N.J.

[22] Filed: July 11, 1973

[21] Appl. No.: 378,175

[52] U.S. Cl. .................... 321/27 R, 307/82, 307/87
[51] Int. Cl. ........................................... H02m 7/00
[58] Field of Search ............... 307/82, 87; 321/27 R

[56] References Cited
UNITED STATES PATENTS

| | | | |
|---|---|---|---|
| 3,549,977 | 12/1970 | Watkins | 321/27 X |
| 3,600,655 | 8/1971 | Karlin et al. | 321/27 R |
| 3,675,037 | 7/1972 | Hamilton | 307/87 |

Primary Examiner—William M. Shoop, Jr.
Attorney, Agent, or Firm—Ostrolenk, Faber, Gerb & Soffen

[57] ABSTRACT

Phase lock circuitry for operating a plurality of static inverters in synchronism. The phase lock circuitry includes means for detecting operation of the phase lock circuitry master oscillator, causing the local oscillators of the static inverters to be disabled. The output of the master oscillator is utilized to drive all inverters coupled to the parallel phase lock circuitry. The parallel phase lock circuitry also includes an output which assures that the local flip-flop of each static inverter is in the appropriate state while the output of the master oscillator controls the operating rate of the static inverter flip-flops, thus absolutely assuring operation of the plurality of static inverters in synchronism with the master oscillator. In the event of a failure of the master oscillator a level switch detects this condition to permit operation of the static inverters controlled by the phase lock circuitry without in any way effecting their operability providing a safety feature wherein the static inverters remain operational, but are not necessarily maintained in synchronism.

5 Claims, 4 Drawing Figures

PARALLEL PHASE LOCK CIRCUITRY FOR INVERTERS AND THE LIKE

The present invention relates to static inverters and more particularly to a parallel phase lock circuit for maintaining the operation of a plurality of static inverters in absolute synchronism.

BACKGROUND OF THE INVENTION

Inverters find widespread use in a number of different fields and are utilized due to their capability of accepting d.c. input power to develop a regulated a.c. output signal at a regulated frequency. Static inverters, i.e., inverters comprised of solid state devices, are typically utilized to generate a regulated a.c. signal having a frequency of 400 Hz, which is especially adapted for operating instruments in navigation equipment aboard aircraft.

The advent of static inverters for airborne a.c. power sources where such static inverters have limited capability, has created problems when the load requirement is greater than the rating of a unit. This necessitates the employment of either a larger static inverter or several smaller units. In many cases a static inverter having a greater output capacity is not available, is too large for the space which it is intended to occupy, or has an excessive capability resulting in poor effeciency and wasted power and expenditure. The use of several static inverter units of lower power rating is one possible technique which may be employed in providing the necessary power requirements. However, this creates the need for synchronization of the output frequency. To date, no existing techniques are available for providing such synchronization.

A BRIEF DESCRIPTION OF THE INVENTION

The invention set forth herein comprises a phase lock circuit which provides synchronization signals for as many as three static inverters of any power rating. The novel phase lock circuitry of the present invention utilizes all solid state circuitry thereby yielding highly reliable operating characteristics, while providing a highly economic means for utilizing lower power static inverter units for high load requirements.

The basic concept of the phase locking circuitry of the present invention resides in the fact that the novel circuitry employs a master oscillator adapted to override the oscillators of the individual static inverters by substituting a signal to the control circuitry of the inverter which slaves the inverter frequency and phasing of the output voltage to the frequency of the phase lock circuitry. The phase lock circuitry receives all of its operating power from the inverters to which it is connected. All three static inverters are thereby controlled with a common frequency and the output voltage of each inverter can now be paralleled to a common load. The phase locking circuitry incorporates a safety feature whereby, in the event of a failure of the master oscillator, the static inverter units connected thereto remain operational, but are not necessarily in synchronism. An additional feature of the phase locking circuitry is its capability of providing redundancy with static inverters giving extra safety to airborne applications. The phase locking circuitry utilizes sensing means for detecting operation of the master oscillator so as to disable the local oscillators of the static inverters. Conversely, due to any possible failure in the master oscillator, the local oscillators of the static inverters, through the sensing means, are again enabled so as to suffer no loss in the operation of the inverters. Further means provided between the master oscillator and the frequency divider circuits employed within each static inverter function to assure that the frequency dividing circuitry of all static inverters coupled to the phase locking circuitry are in the same state at the same time, in addition to being operated in synchronism at the same frequency rate.

OBJECTS OF THE INVENTION

It is therefore one object of the present invention to provide a novel phase locking circuitry for controlling a plurality of static inverters so as to assure their synchronous operation and thereby enable parallel connection of the inverters if desired.

Another object of the present invention is to provide novel phase locking circuitry for use in controlling a plurality of static inverters wherein means are provided for assuring that the state of each inverter is the same at all times during operation thereof in addition to the output frequencies of the static inverters being in exact synchronism.

Still another object of the present invention is to provide novel phase locking circuitry for controlling a plurality of static inverters wherein means are utilized to permit continued operation of the individual static inverters in the advent of any failure in the phase locking circuitry master oscillator to yield a safety feature wherein the individual static inverters remain operational but are not necessarily in synchronism.

A BRIEF DESCRIPTION OF THE FIGURES

The above as well as other objects of the present invention will become apparent when reading the accompanying description and drawings in which.

DETAILED DESCRIPTION OF THE FIGURES

Figure 2:
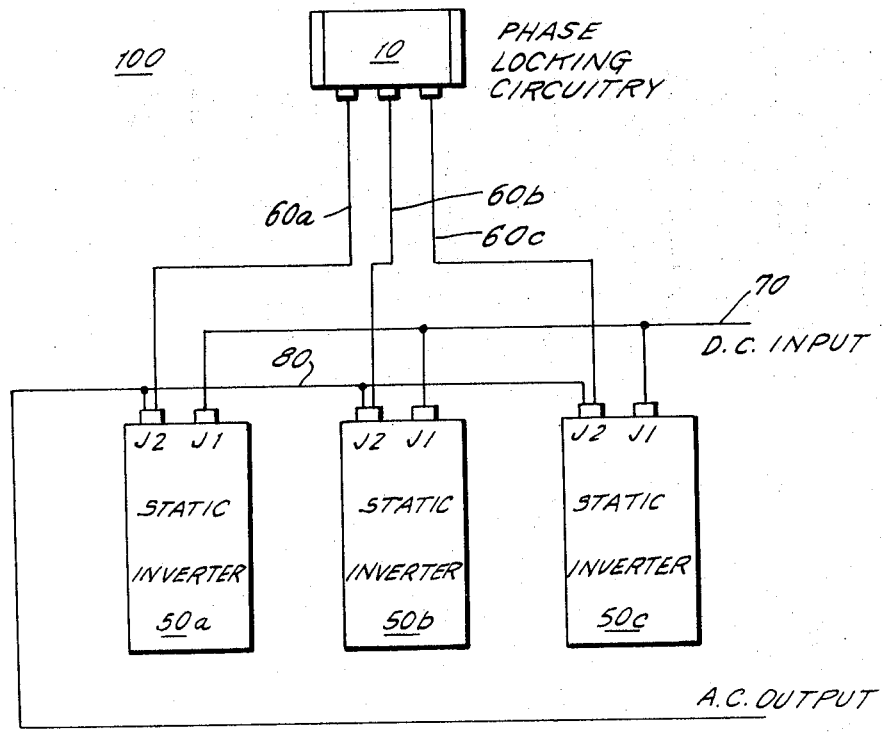
FIG. 2 shows a simplified system wiring diagram of the phase locking circuitry and the manner in which a plurality of static inverters may be connected thereto in a typical installation.

FIG. 2 shows a system wiring diagram 100 wherein a phase locking circuit 10 is shown as being electrically connected to three static inverters 50a–50c wherein the phase locking circuitry functions to provide a master signal which overrides the oscillator in each static inverter and supplies a common synchronizing signal to each static inverter, locking and synchronizing all of the inverters to a common frequency of, for example, 400 Hz. Three cables 60a–60c are utilized to connect the phase locking circuit 10 to each inverter in the manner shown. The d.c. input utilized to power the static inverters 50a–50c, as well as the phase locking circuit 10 are supplied from a common d.c. input through a common d.c. bus 70. Due to the unique manner in which the phase locking circuitry 10 operates, the static inverters 50a–50c are all in synchronism and may thereby be connected in parallel through a common output line 80 to increase the total output available by a factor of three, thus providing significantly increased 400 Hz power. If desired, the static inverters 50a– 50c may be operated independently by disconnecting the common a.c. output line 80 and coupling the a.c. output lines of each static inverter to a load thereby providing triple redundancy of total output power for any one of three static inverters when operated in parallel with two similar inverters.

Figure 1:
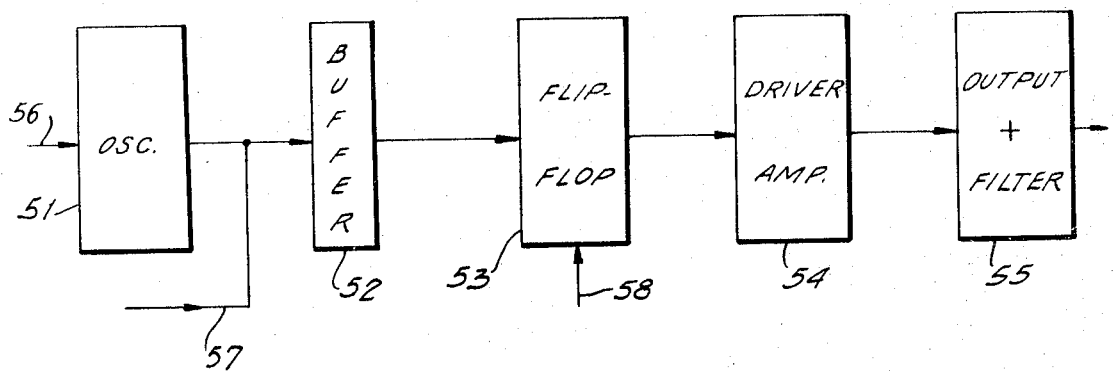
FIG. 1 is a block diagram of a static inverter of the type which may be controlled by the novel circuit of the present invention and which is presented herein for facilitating an understanding of the present invention.

FIG. 1 shows, in simplified block diagram form, the basic components of a static inverter 50 which is comprised of an oscillator 51 which typically develops an output signal of 800 Hz. A more detailed description of a static inverter is set forth in U.S. Pat. No. 3,691,449 dated Sept. 12, 1972, incorporated herein by reference thereto. The output oscillator 51 is coupled to a buffer-amplifier circuit 52 which functions to couple and amplify the oscillator output signal to a bistable flip-flop circuit 53 which functions as a frequency divider circuit to reduce the output frequency of oscillator 51 to 400 Hz. The frequency divided output of flip-flop 53 is coupled to a driver amplifier circuit 54 which serves to amplify the output of flip-flop 53 and couple it to the output circuit 55 which includes filter means for developing a regulated a.c. signal having a precise output frequency of 400 Hz and which is especially adapted for use in powering aircraft instrumentation and the like.

As will be better understood from a consideration of the detailed description of the phase locking circuitry set forth hereinbelow, the oscillator 51 of each inverter 50 is further provided with an input 56 which is adapted to receive a disabling signal coupled to the oscillators timing capacitor (not shown for purposes of simplicity) so that the oscillator 51 may be disabled when the static inverter operates under control of a disabling signal developed by the phase locking circuitry. The buffer circuit 52 of each inverter is further provided with an input 57 for receiving the output of the phase locking circuit master oscillator and the flip-flop 53 of each static inverter is provided with a reference input terminal 58 which is adapted to receive the phase locking circuitry reference synchronizing signal so as to insure the fact that the state of each flip-flop in each static inverter will be the same.

Figure 3:
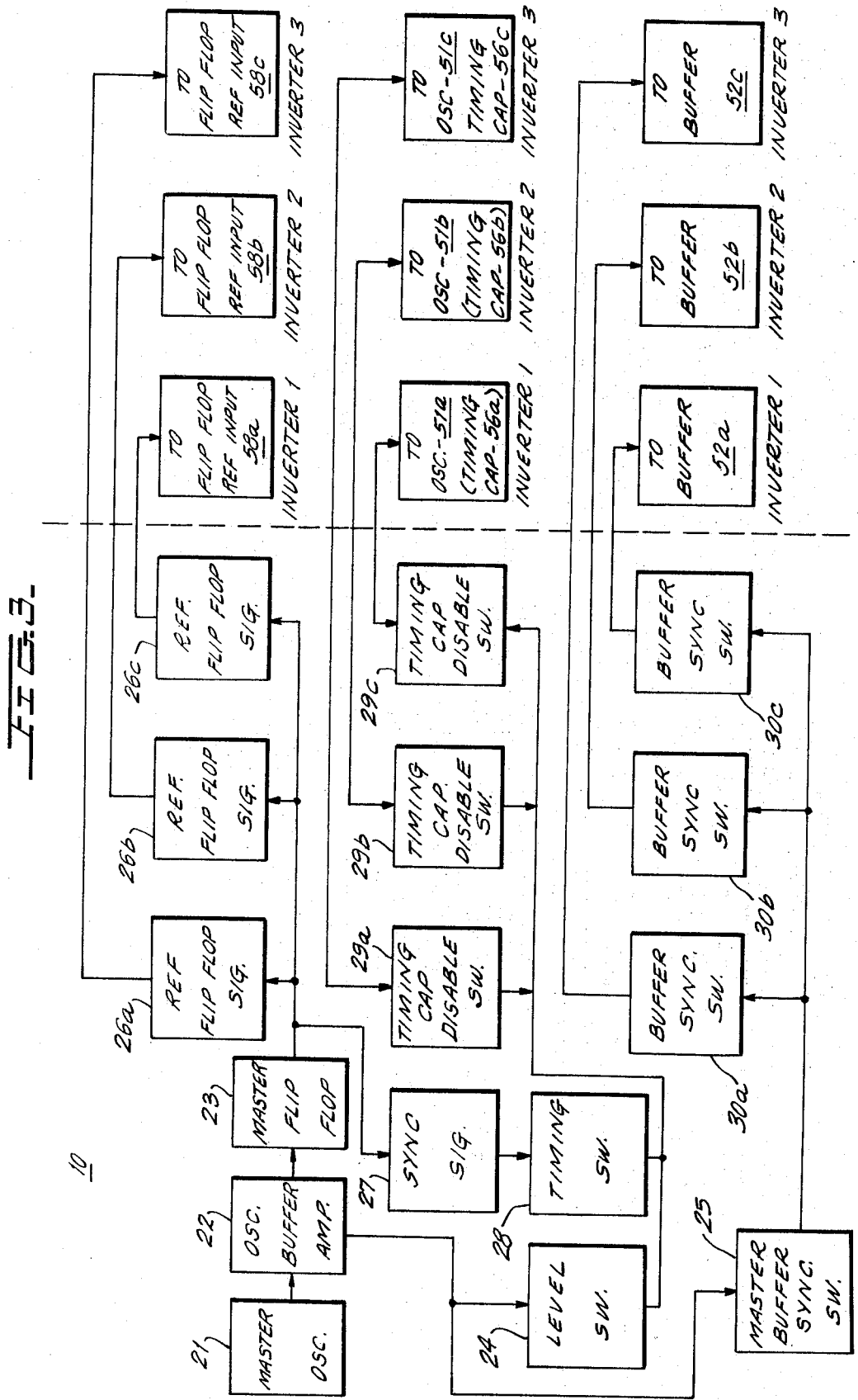
FIG. 3 is a block diagram showing the phase locking circuit of FIG. 2 in greater detail.

FIG. 3 shows a more detailed block diagram of the phase locking circuitry 10 to show the manner in which the frequency is controlled and the clock signal is transmitted to each of the three static inverters.

The master oscillator 21 which is designed to operate at a frequency of 800 Hz, drives a buffer-amplifier 22 which, in turn, drives a master flip-flop 23. Master flip-flop 23 serves as a frequency divider circuitry whose output frequency is 400 Hz.

The output of buffer-amplifier 22 also drives a level switch 24 and a master buffer synchronizing switch 25.

The master flip-flop 23 generates a reference flip-flop signal which is coupled in common to the three inverter reference flip-flops through circuits 26a–26c, respectively. The master flip-flop 23 also provides a signal for the synchronization timing switch 28 through a synchronization signal circuit 27 in order to simultaneously energize the timing capacitor disabling switch circuits 29a–29c for disabling the local oscillators 56a–56c of the connected static inverters. The master buffer synchronization switch 25 powers three buffer synchronization switch circuits 30a–30c to generate signals, simultaneously applying the output of the master oscillator to the buffer amplifiers 52a–52c of the static inverters 50a–50c.

The operation of the phase locking circuitry is as follows:

The output of master oscillator 21 is coupled through master buffer sync switch 25 and the individual circuits 30a–30c to the inputs 57 (see FIG. 1) of buffers 52a–52c of each static inverter. The fact that the master oscillator 21 is operative is detected by level switch 24 whose output is coupled to the timing capacitor disable switch circuits 29a–29c for coupling disabling signals to the timing capacitor disabling inputs 56a–56c of each of the local oscillators 51a–51c provided in each static inverter. Thus, it can be seen that the local oscillators 51 are all disabled. However, the master oscillator output is coupled into the buffer 52 of each static inverter through input 57 and thereby overrides the disabled local oscillators.

The output of master flip-flop 23 is coupled through the reference flip-flop signal circuits 26a–26c to the reference input terminals 58a–58c of each static inverter flip-flop 53a–53c. Thus, the phase locking circuitry serves to drive all three static inverters 50a–50c at the same clock frequency and simultaneously assures the fact that the state of each flip-flop 53 in each static inverter is the same.

If, for any reason, a failure occurs in the operation of master oscillator 21, this is detected by level switch 24 to immediately terminate the local oscillator disabling signals causing each of the local oscillators 51 to immediately be rendered operative so that there is no loss in the continuity of the operation of each of the individual static inverters, although a loss of synchronism between and among the static inverters may result. Nevertheless, this arrangement provides a safety feature in that the static inverters continue to remain operational.

Figure 4:
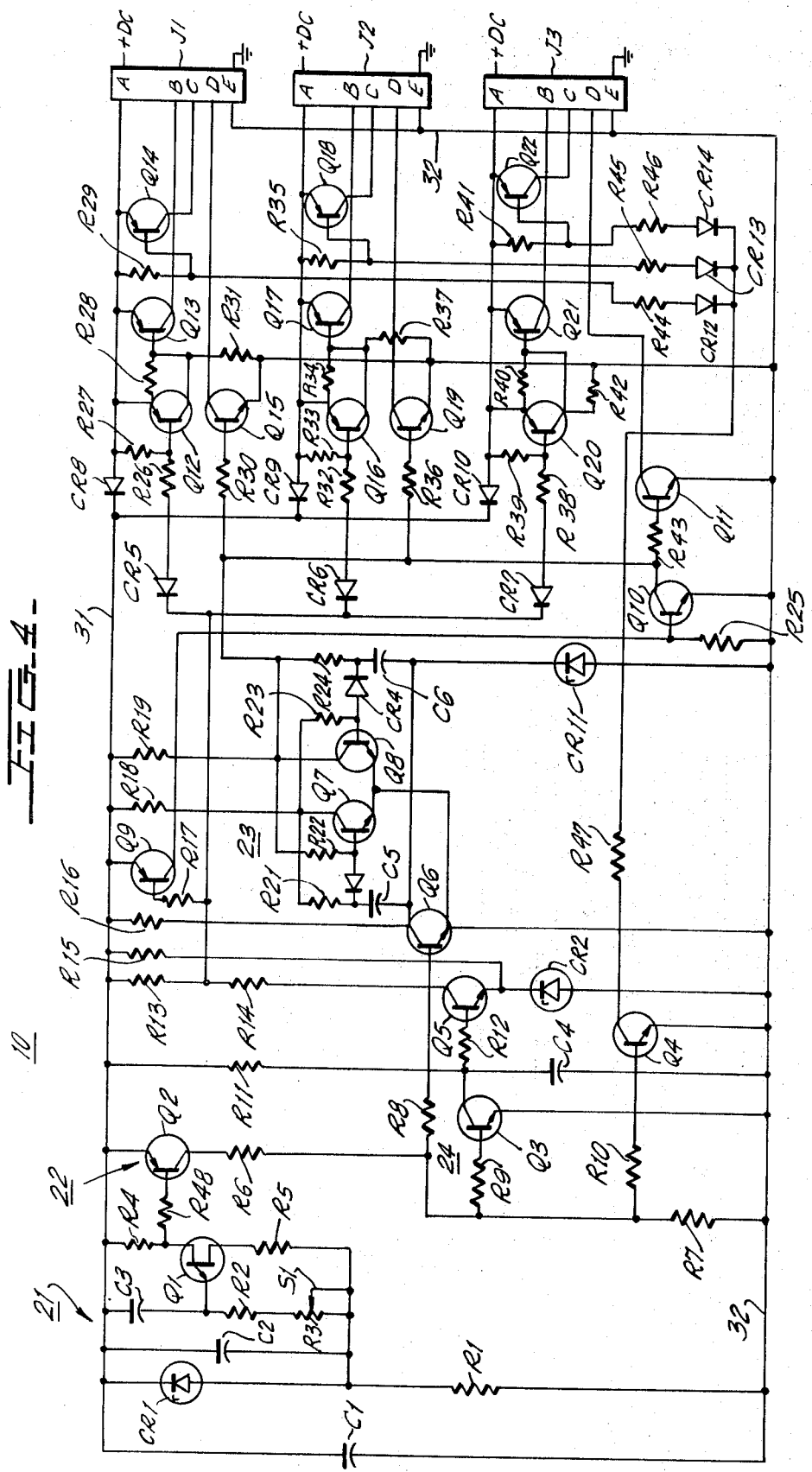
FIG. 4 shows a detailed schematic diagram of the phase locking circuitry of FIGS. 2 and 3.

FIG. 4 shows a detailed schematic diagram of the phase lock circuitry. Input power for the phase lock circuitry 10 is derived from all or any one of the connected static inverters 50 through pin A of the connector blocks J1, J2 and J3 so as to provide positive d.c. voltage for powering the phase locking circuit. Components that are assigned to control individual static inverters are connected to the A pin of their associated connector J. Other components that perform common functions are powered from a positive bus made up from the three separate d.c. inputs which are diode isolated by the diodes CR8, CR9 and CR10. The outputs of these three diodes are connected in common to conductor 31. The ground terminals of each of the static inverters are coupled to pin E of their associated connectors J. The E pins of each of these connectors are, in turn, coupled in common to ground bus line 32.

Capacitor C1 is coupled between the positive and ground bus lines 31 and 32 and functions as a filter capacitor to smooth out any ripple on the d.c. bus. Zener diode CR1 is connected in series with resistor R1 and this series path is coupled across buses 31 and 32. The Zener diode CR1 provides a constant voltage for the phase locking circuit master oscillator consisting of capacitors C2 and C3, resistors R2, R3, R4 and R5 and transistor Q1. Resistor R3 is adjustable through its slider arm S1 which is utilized for precisely regulating the oscillator output frequency. Transistor Q1 is a complementary unijunction transistor and has highly stable operating parameters over a wide temperature range. The frequency of the master oscillator 21 is set at 800 Hz for operating with eventual use in a 400 Hz single phase system. For other requirements such as polyphase systems, the operating frequency can be set at other than 800 Hz as may be required.

Resistors R6, R7 and R48 and transistor Q2 form the oscillator buffer amplifier 22 which serves to step up the signal level of the master oscillator 21. The output of oscillator 21 is taken at the common terminal between Q1 and R4 and is coupled to the base of Q2 through R48. The Q2 emitter is coupled to positive line 31 while the Q2 collector is coupled through the series connector resistors R6 and R7 to ground bus 32.

Resistors R9, R11, R12, R13 and R14, capacitor C4, Zener diode CR2 and transistors Q3 and Q5 comprise the level sensing switch 24 which serves to sense the condition of master oscillator 21. The output of oscillator buffer amplifier 22 is taken at the common terminal between R6 and R7 and is coupled into the base of Q3 through resistor R9. The emitter of Q3 is coupled to ground bus 32 while the collector of Q3 is coupled to the common terminal between resistor R11 and capacitor C4. The output of Q3 is taken from its collector which is coupled into the base of Q5 through R12. The collector of Q5 is coupled to the positive d.c. bus 31 through series connected resistors R13 and R14. The Q5 emitter is coupled to one terminal of Zener diode CR2 and to positive d.c. bus 31 through R15. The remaining terminal of CR2 is coupled to ground bus 32. CR2 thus develops a "reference" level at the Q5 emitter. The output of Q5 is taken at the common terminal between R13 and R14. So long as master oscillator 21 is operating, transistor Q5 remains in the "off" condition so that the level of positive d.c. bus 31 is coupled to the base electrodes of Q9, Q12, Q16 and Q20 to maintain these transistors in the "off" state which allows the timing capacitor disable switches consisting of transistors Q13, Q17, and Q21 to be biased into the "on" state which serves to disable the oscillators in the connected static inverters.

The continued operation of master oscillator 21 alternately causes the conduction and non-conduction of Q3 at the 800 Hz frequency rate preventing C4 from fully charging (since C4 is fully discharged each time Q3 conducts). This causes the level at the base of Q5 to be too low to turn Q5 on, thereby applying the level on positive d.c. bus 31 to the base electrodes of Q9, Q12, Q16 and Q20. Since the emitters of Q9, Q12, Q16 and Q20 are also connected to the positive d.c. level, all of these transistors will be in the off state. This permits the voltage drop to be developed across resistors R28, R34 and R40 to develop a voltage drop sufficient to place the base electrodes of Q13, Q17 and Q21 at a level below the positive d.c. voltage level to turn Q13, Q17 and Q21 on, thereby applying the positive d.c. level to each of the oscillator input terminals 56a–56c which serves to disable the local oscillators provided in each of the connected static inverters 50a–50c.

If the master oscillator 21 stops, Q3 is turned off and C4 will charge to a positive d.c. causing Q5 to turn on. The IR drop across R13 is sufficient to turn Q9, Q12, Q16 and Q20 "on," thereby applying the positive d.c. level to the base electrodes of Q13, Q17 and Q21 to turn these transistors off and thereby enable the local oscillators 51a–51c to resume operation.

Resistors R10 and R47 and transistor Q4 comprise the master buffer synchronization switch which supplies a signal to the buffer sync switch circuits consisting of diodes CR12, CR13 and CR14 and bias resistors R44, R29, R45, R35, R46 and R41, and transistors Q14, Q18, Q22. The buffer switches supply the signal to the static inverter control circuitry that synchronizes a frequency of each static inverter to the master frequency. When master oscillator 21 is operating, Q2 and hence Q4 are alternately rendered conductive and nonconductive (Q4 being turned on when Q2 is turned on and being turned off when Q2 is turned off) to provide an output at the 800 Hz rate at the collector of Q4 which is coupled through R47 in common to the cathodes of CR12–CR14. The anodes of CR12–CR14 are each respectively coupled to series connected resistors R44–R29, R45–R35, and R46–R41, with the opposite terminals of R29, R35 and R41 being coupled to the positive d.c. line. The common terminals between R29–R44 and R35–R45 and R41–R46 are respectively coupled to the base electrodes of Q14, Q18 and Q22 whose outputs, taken from their respective collectors, are coupled into the inputs 57a–57c of the buffer amplifiers 52a–52c respectively.

The master bistable flip-flop 23 is comprised of resistors R8, R16, R18, R19, R21, R22, R23 and R24, diodes CR3, CR4 and CR11, capacitors C5 and C6, and transistors Q6, Q7 and Q8 to produce a square wave with a 400 Hz frequency, thereby serving as a frequency divider relative to the 800 Hz oscillator signal derived from the master oscillator 21. The output of the master bistable flip-flop is coupled to the reference flip-flop control components consisting of resistors R30, R36 and R43, transistors Q15, Q19 and Q11 whose collectors are respectively connected to the reference inputs 58a–58c of the static inverter of flip-flops 53a–53c to assure the fact that the flip-flops 53 of all the static inverters will be in the same state.

In the event of a failure of the master oscillator, it should be noted that Q9 has its collector coupled to the base of Q10 through R20 so that when the master oscillator is off, Q9 is on turning Q10 on to disable Q11 and prevent its being under control of the master flip-flop 23. Likewise, Q12 and Q16 turn on causing the level at the emitters of Q15 and Q19 to increase thereby disabling Q15 and Q19 from being under the control of the master flip-flop 23 to isolate the static inverter flip-flops 53 of each of the static inverters from being controlled by the phase locking circuitry.

The provision of absolute synchronism of the static inverters through the use of the master oscillator safely permits the outputs of the plural static inverters to be coupled in parallel thereby increasing the total output available by a factor of 3. The safety feature provided by the level sensing switch 24 functions to immediately release the static inverters from control by the phase locking circuitry to assure their continuous and uninterrupted operation.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Phase locking circuit for synchronizing a plurality of static inverters each comprising a local oscillator, a local bistable frequency divider coupled to the local oscillator and an output circuit coupled to the frequency divider for producing a regulated a.c. output at a regulated frequency, said phase locking circuit comprising:

a master oscillator;

a master buffer sync switch coupled to said master oscillator and having its output coupled in common to each of the local bistable frequency dividers for driving the local bistable frequency dividers in synchronism;

sensing means coupled to said master oscillator for sensing the operating condition of said master oscillator to generate a disabling signal only when said master oscillator is operating, which disabling signal is coupled in common to the local oscillators of said inverters to disable said local oscillators.

2. The phase locking circuit of claim 1 further comprising a master bistable frequency divider coupled to said master oscillator for dividing the output frequency of said master oscillator, connecting circuit means coupling the output of said master bistable frequency divider being coupled in common to each of said local flip-flops to cause all of said local flip-flops to be in either the set or reset states simultaneously.

3. The phase locking circuit of claim 2 wherein the output of said sensing means is coupled to said connecting circuit means to disable said connecting circuit means from operating under control of said master bistable frequency divider.

4. The phase locking circuit of claim 1 wherein the local oscillators and the master oscillator are all adapted to operate at the same frequency.

5. The phase locking circuit of claim 1 wherein said master frequency divider is a bistable flip-flop for dividing the output of said master oscillator to an output frequency equal to one-half the frequency of said master oscillator.

* * * * *